United States Patent
Bialek et al.

(10) Patent No.: US 6,787,176 B1
(45) Date of Patent: Sep. 7, 2004

(54) LOW FAT SPOONABLE OR SPREADABLE FOOD PRODUCTS

(75) Inventors: Jadwiga Malgorzata Bialek, Shambrook (GB); Malcolm Glyn Jones, Shambrook (GB)

(73) Assignee: Bestfoods, Englewood Cliffs, NJ (US)

( * ) Notice: Subject to any disclaimer, the term of this patent is extended or adjusted under 35 U.S.C. 154(b) by 211 days.

(21) Appl. No.: 10/048,615

(22) PCT Filed: Jul. 4, 2000

(86) PCT No.: PCT/EP00/06338

§ 371 (c)(1),
(2), (4) Date: Feb. 4, 2002

(87) PCT Pub. No.: WO01/10235

PCT Pub. Date: Feb. 15, 2001

(30) Foreign Application Priority Data

Aug. 4, 1999 (EP) .............................. 99306186

(51) Int. Cl.⁷ ................................ A23L 1/24
(52) U.S. Cl. ....................... 426/605; 426/602
(58) Field of Search ............... 426/601–604, 426/605

(56) References Cited

U.S. PATENT DOCUMENTS

| | | | | |
|---|---|---|---|---|
| 3,946,122 A | * | 3/1976 | Scharp | 426/604 |
| 4,632,841 A | * | 12/1986 | Parke et al. | 426/604 |
| 4,849,243 A | * | 7/1989 | Sreenivasan et al. | 426/602 |
| 5,149,557 A | * | 9/1992 | Morrison et al. | 426/570 |
| 5,151,451 A | * | 9/1992 | Brown et al. | 514/773 |
| 5,336,514 A | * | 8/1994 | Jones et al. | 426/564 |
| H1394 H | * | 1/1995 | Dreese | 426/603 |
| 5,472,727 A | * | 12/1995 | Campbell et al. | 426/570 |
| 5,718,969 A | * | 2/1998 | Sewall et al. | 428/304.4 |
| 5,904,949 A | * | 5/1999 | Reddy et al. | 426/603 |
| 6,136,363 A | * | 10/2000 | Bialek et al. | 426/573 |

FOREIGN PATENT DOCUMENTS

| | | |
|---|---|---|
| EP | 0 355 908 A1 | 2/1990 |
| EP | 0 432 835 A1 | 6/1991 |
| EP | 0 558 113 A1 | 9/1993 |
| WO | 99/02047 | 1/1999 |

OTHER PUBLICATIONS

European Search Report (EP 99 30 6186).
International Search Report (PCT/EP 00/06338).
"Cream Alternatives"; I.J. Campbell and M.G. Jones; *Lipid Technologies And Applications*; pp. 355–369, (1997), publ. Marchel Dekker NY, USA.

* cited by examiner

*Primary Examiner*—Carolyn Paden

(57) ABSTRACT

Spoonable or spreadable compositions containing less than 80% fat are disclosed. Such compositions comprise water, fat, micro gel particles, a protein and a de-stabilizing emulsifier. The aqueous phase of the composition forms a continuous phase with the fat phase as a continuous network therein, giving a bi-continuous structure with the microgel particles dispersed in the water phase.

16 Claims, 2 Drawing Sheets

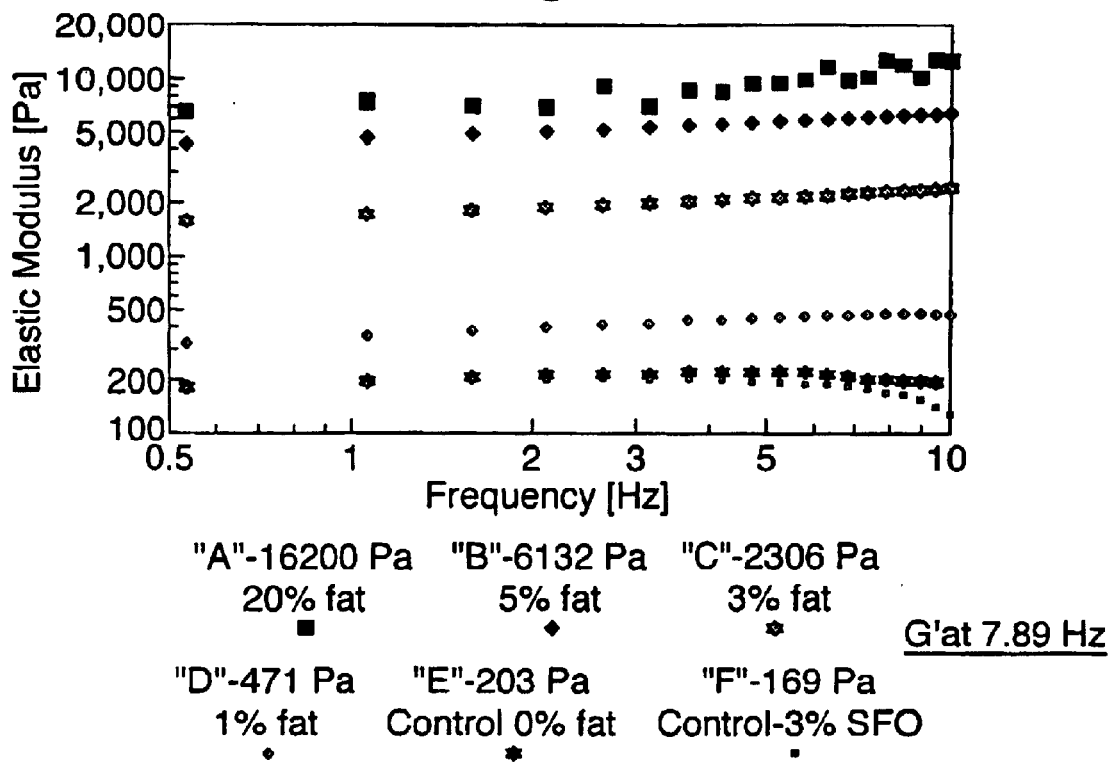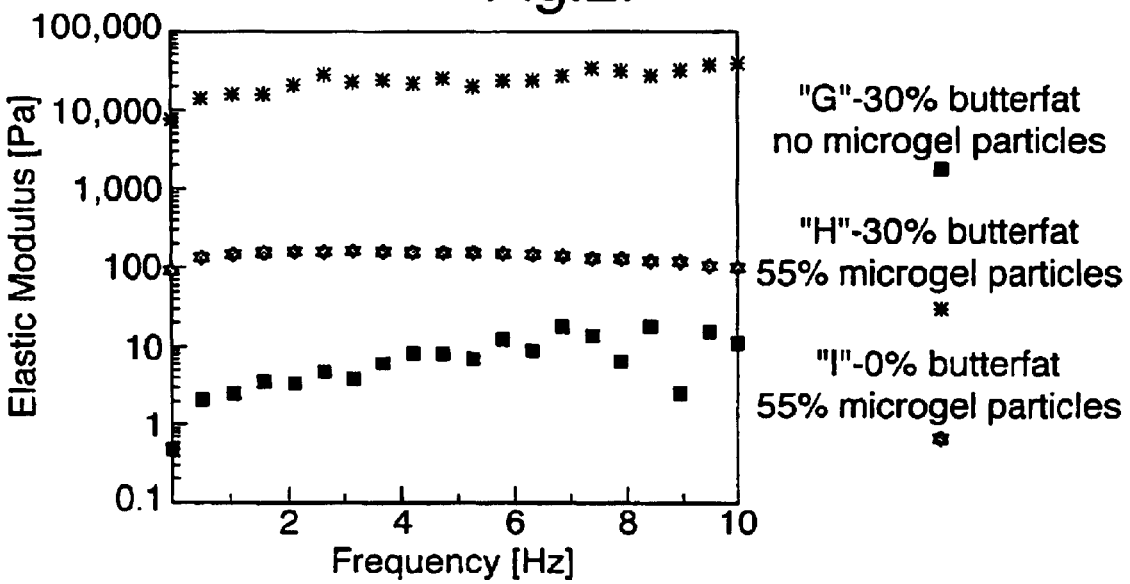

4.5%FAT
(50%CN:50%PK 38)
■

10%FAT
(50%CN:50%PK 38)
♦

LOW FAT SPOONABLE OR SPREADABLE FOOD PRODUCTS

FIELD OF THE INVENTION

The present invention relates to a spoonable or spreadable composition, resembling (part of) the properties of mayonnaise or spreads.

BACKGROUND OF THE INVENTION

Mayonnaise and spreads (i.e. butter-resembling products as are used for spreading on slices of bread and bread rolls, such as are known as margarine) have a rheological behavior which usually makes them spoonable (in the case of mayonnaise) or spreadable (in the case of spreads). These are important attributes for these products.

Conventional mayonnaise contains high levels (70–80%) of an oil phase, which is dispersed in a water phase. The presence of the large amount of dispersed phase ensures the product has a spoonable character. When preparing mayonnaise-like products having a reduced amount of oil, measures will have to be taken to obtain a product having a sufficient "rigid" character, so as to be spoonable. Usually this is done by adding thickeners such as starches or gums to thicken the water phase.

In conventional spreads (80% fat) a spreadable character is obtained by choosing the right fat blend having a specific melting behavior. The same applies for water-continuous spreads having a fat content of about 80–40%. When reducing the amount of fat in a water-continuous spread to e.g. less than 40% (and thus increasing the amount of water to about 80%) specific measures will need to be taken in order to ensure a sufficient "rigidity", so as to maintain a spreadable product. Again, this may usually be achieved by adding to the composition thickeners such as starches or gums.

The application of gums and starches have a number of disadvantages, as are known in the art (poor melting behavior, starchy taste, stickiness, etcetera). Another solution that has been proposed to obtain mayonnaise-like products which have a reduced amount of fat phase, which do not contain large amounts of gums or starches, and which oil products are still spoonable or spreadable is the use of micro gel particles (as is described in EP 355908, EP 432835, EP 558113). Such microgel particles are generally prepared from gel-forming hydrocolloids, such as agar, alginate, pectin, gellan, and carrageenans.

The use of such micro gel particles in e.g. low-fat mayonnaise-type products may give sufficient rigidity to the product, but breakdown in the mouth of the emulsion is still far from that as experienced in the case of traditional mayonnaise. More in particular, breakdown is too slow.

In products such as whipped dairy cream it is known that structure can be obtained using a technique, which is know as "clumping". Clumping is one of the three aggregation states that can occur when fat or oil droplets are dispersed in an aqueous phase, the others being flocculation and clustering. Clumping is a case of partial coalescence, where oil droplets are no longer discrete, but also do not completely coalesce because of the rigidity of fat. Prerequisites for clumping are the presence of solid fat, a stabilising emulsifier, preferably protein, and also of a de-stabilizing emulsifier, where both types of emulsifiers act at the interface of fat and water. Such partial coalescence is described e.g. in: Cream Alternatives, by I. J. Campbell, and M. G. Jones in Lipid Technologies and applications, 355–369 (1997), publ. Marcel Dekker NY, USA.

SUMMARY OF THE INVENTION

There is a need for low-fat, water continuous emulsions, resembling as much as possible the properties of e.g. mayonnaise or spreads, with respect to both rigidity and melting behavior. Rigidity is herein to be seen as relating to a spoonable or spreadable product, which may be expressed (for the purpose of this invention) as having an elastic modulus G' of at least 250 Pa.

It has now been found that the above may be provided by an edible composition containing (by weight, based on the final composition as consumed):

- 10–65% of water as a continuous phase,
- 1–45% of a fat phase,
- 30–80% microgel particles dispersed in the continuous phase,
- 0.1–10% of a stabilising emulsifier, preferably being a protein,
- 0.01–2% of a de-stabilizing emulsifier, and wherein the composition has an elastic modulus (G') of at least 250 Pa and less than 100,000 Pa. Preferably the elastic modulus is between 500 and 10,000 Pa.

The above may be conveniently achieved when at least part of the fat phase (e.g. at least 50%) is solid at 10° C., preferably also at 5° C. Suitable solid fats in this respect are e.g. hardened palm kernel fat (PK38), coconut fat (CN), hardened coconut fat (CN33), butter fat or mixtures thereof. Actual amounts of fat, its melting point, and the ratio liquid/solid fat that will give satisfactory results will depend on e.g. the protein and de-stabilizing emulsifier, temperature of processing, etcetera.

The micro gel particles in the above may conveniently comprise any of the known gel-forming hydrocolloids, such as agar, alginate, pectin, gellan, carrageenans. These materials may be made into (aqueous) micro gel particles by techniques as are known in the art, such as applying shear under gelling conditions. Usually, at least 80% (by weight) of such microgel particles will have a size of 5–100 μm.

Examples of de-stabilizing emulsifiers are: monoglycerides, lecithin, polyglycerol esters, and Tween's. In particular are preferred the de-stabilizing emulsifiers, which contain one or more unsaturated fatty acid chains (e.g. monoglycerides of oleic acid).

In the compositions according to the invention, the (stabilizing) protein as well as the de-stabilizing emulsifier may be supplied by one and the same composition. An example of a composition capable of both functions is egg yolk. As egg-yolk usually contains about 50% of water, the amount to be used will (in such case) generally between 0.2–25% (in order to have a dry protein weight of 0.1–10%), preferably 5–20%. Hence, the compositions according to the invention may contain 0.2–25%, preferably 5–20% of egg yolk, to at least partly supply the amount of (stabilizing) protein and de-stabilizing emulsifier.

The compositions according to the invention may be obtained conveniently by a process for the preparation of a spreadable or spoonable food composition having an elastic modulus (G') of between 250 and 100,000 Pa, which composition comprises

- 10–65% of water as a continuous phase,
- 1–45% of a fat phase,
- 30–80% microgel particles dispersed in the continuous phase,
- 0.1–10% of a protein,
- 0.01–2% of a de-stabilizing emulsifier, and which process comprises at least the steps of:
melting the fat phase,
emulsify the molten fat in (part of) the water phase
add the microgel particles,
mix,
cool to a temperature at which at least 50% of the fat is solid,
and wherein the protein (or other stabilising emulsfier) and emulsifier are added to the water phase or the fat phase, or both, prior to adding the micro gel particles.

All percentages are by weight, unless indicated otherwise.

BRIEF DESCRIPTION OF THE DRAWINGS

FIGS. 1–4 are graphs of the elastic modulus of various compositions as a function of frequency.

DETAILED DESCRIPTION OF THE INVENTION

Without wishing to be bound by theory, it is believed that in the compositions according to the invention the increased rigidity and improved melting behavior (when compared to compositions as are known in the art) is achieved by the combination of the micro gel particles and fat being present as a network of "clumped" fat droplets. It is highly surprising that even at very low levels of fat (e.g. 1–3%) a clumped fat network is formed, as all conventional applications in which a clumped fat network is obtained require the presence of fat in an amount of at least 20–25%.

It is believed that in the compositions according to the present invention the aqueous phase forms a continuous phase with the fat phase as a continuous network therein, a giving a bi-continuous structure with the microgel particles dispersed in the water phase.

The compositions according to the invention can suitable be used to prepare compositions such as mayonnaise-type products with a reduced (1–45%) amount of fat. Also, the compositions can be used for the preparation of water-continuous spreads with reduced (1–45%) amounts of fat. For example, a water-continuous spread containing 1–20% of fat may show an improved flavor release when compared with fat-continuous (very) low fat spreads, and in particular when butter fat is applied to prepared the clumped fat network in the present invention.

The invention may also be applied in other water continuous compositions, such as dressings, sauces, toppings, fillings, etcetera.

The presence of a clumped fat network requires the presence of at least some solid fat and a stabilising emulsifier, preferably protein. Said protein may be from various sources, such as whey protein, casein, soy protein, egg white. Also, the protein may be supplied by egg yolk, in the form of lipoprotein.

In the compositions according to the invention, the level as fat can be as low as 1%. Levels of 1–25% are preferred. For some purposes, however, lower limits of 3% of fat can be preferred, and upper limits of 15 or 20%.

In the process for the preparation of the compositions according to the invention, as set out above, it is preferred that the emulsion is homogenized before adding microgel particles. It is also preferred that the cooling is effected to a temperature of less than 10° C., preferably less than 5° C.

EXAMPLES

Examples of the products and process of the invention will now be described to illustrate, but not to limit, the invention, with reference to accompanying FIGS. 1, 2 and 3.

Figure 3:
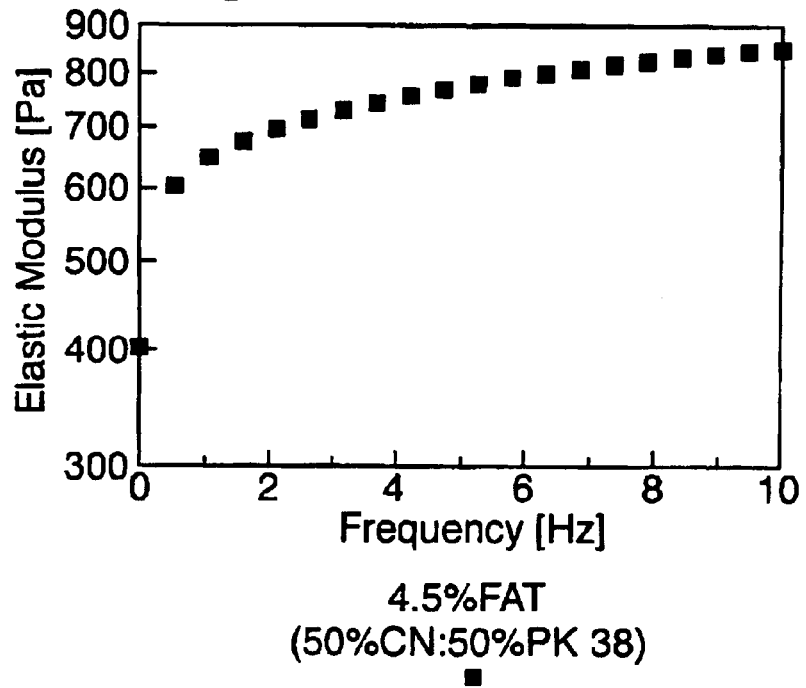

FIGS. 1–3 are the graphs of frequency in Hz (x-axis) against elastic modulus-G' in Pa (y-axis) showing plots of the network strength (as represented by the elastic modulus), for six examples (A–F) in FIG. 1, three examples (G–I) in FIG. 2, and one model composition in FIG. 3.

A premix of dispersed microgel particles was prepared by dispersing 1.25 wt % iota carrageenan, 1.25 wt % kappa carrageenan and 0.5 wt % potassium chloride in 97 wt % water (all by weight of the premix), heating the dispersion to 70° C. and cooling it to 5° C. whilst shearing through a scraped surface heat exchanger at (4000 rpm). A mixture of hard (kappa) and soft (iota) particles was obtained. Hard kappa carrageenan particles had a mean diameter of from 0.1–30 μm and soft iota carrageenan had a mean diameter of from 20–50 μm.

Separately, the following emulsion ingredients were used for the preparation of the emulsion phase:

15.54%—Egg yolk
0.56%—NaCl
0.67%—Lactic acid
0.18%—Potassium Sorbate
22.20%—PK 38 fat
22.20%—CN fat
38.66%—Deionised water
all by weight of this phase, pH was 4.4.

The emulsion phase was prepared by dispersing the egg yolk in water (60° C.) using a Silverson™ mixer on setting 4, followed by the addition of NaCl, Potassium Sorbate. PK 38, CN were heated up to 60° C. and mixed with the aqueous phase for 10 minutes on setting 6 to form a coarse "pre-emulsion". This pre-emulsion was acidified with lactic acid and then homogenised using a Crepaco TM 3 piston homogeniser at a pressure of $1 \times 10^4$ kNm$^{-2}$ (100 bar), at 50–60° C.

The premix of dispersed microgel particles was mixed with the emulsion phase using a pin stirred C-unit at a phase volume of 55 to 45 and stored at 5° C. The premix of microgel particles entered the mixer at a temperature of about 5° C., the emulsion premix entered the mixer at a temperature of about 55–60° C., whereas the mixer was kept at a temperature of about 5° C. The amounts were chosen such that 55% of the volume is occupied by the microgel particles, the remaining 45% by the emulsion premix. The fat content of the resulting product hence was about 20%.

Measurement of the Elastic modulus G' as a function of frequency was made using a Carrimed controlled stress rheometer fitted with steel parallel plate of 4 cm diameter. Measurements were made between 0.01 and 10 Hz, at constant stress of 1 Pa at 5° C. Elastic modulus indicates the strength of the particle network.

The resulting elastic modulus plot A is shown in FIG. 1.

Examples B, C and D

Examples B, C and D were prepared in accordance with the procedure used in Example A, for emulsion ingredients as set out in Table 1.

The fat content in the total formulation was: 5% for example B, 3% for example C and 1% for example D.

The elastic moduli of sample B. C and D were measured in accordance with the method used in comparative example A.

The resulting elastic moduli plot B, C and D are shown in FIG. 1.

Example E (Control)

The microgel particles were prepared in accordance with method described in Example A.

Separately, the water phase ingredients (ref. Table 1, Example E) were used for the preparation of the aqueous phase:

The aqueous phase was made by dispersing the egg yolk in water (60° C.) using a Silverson, followed by the addition of NaCl, Potassium Sorbate and acidification step.

The premix of dispersed microgel particles was mixed with the aqueous phase using a pin stirred C-unit at a phase volume of 55 to 45 and stored at 5° C. 55% of the volume is occupied by the microgel particles.

The fat content was 0%.

The elastic moduli of sample E was measured in accordance with the method used in comparative example A. The resulting elastic modulus plot E is shown in FIG. 1.

Example F (Control)

Example F was prepared in accordance with the procedure described in Example A, except in stead of mixture of PK 38 and CN, SFO (i.e. liquid oil) was used. The ingredients are set out in Table 1. The fat content of the final product was 3%.

The elastic modulus of sample F was measured in accordance with the method used in comparative example A. The resulting elastic modulus plot F is shown in FIG. 1.

TABLE 1

| Ingredients | A % | B % | C % | D % | E control % | F control % |
|---|---|---|---|---|---|---|
| Egg yolk | 15.5 | 15.5 | 15.5 | 15.5 | 15.5 | 15.5 |
| NaCl | 0.6 | 0.8 | 0.8 | 0.8 | 0.8 | 0.8 |
| Sucrose | 0.0 | 5.5 | 5.5 | 5.5 | 5.5 | 5.5 |
| Acetic acid | 0.0 | 0.4 | 0.4 | 0.4 | 0.4 | 0.4 |
| Lactic acid | 0.7 | 0.9 | 0.9 | 0.9 | 0.9 | 0.9 |
| K-Sorbate | 0.2 | 0.2 | 0.2 | 0.2 | 0.2 | 0.2 |
| PK 38 | 22.2 | 5.6 | 3.3 | 1.1 | 0.0 | 0.0 |
| CN | 22.2 | 5.6 | 3.3 | 1.1 | 0.0 | 0.0 |
| SFO | 0.0 | 0.0 | 0.0 | 0.0 | 0.0 | 3.0 |
| Deionised water | 38.6 | 65.5 | 70.1 | 74.5 | 76.7 | 73.7 |

All percentages by weight

Example G (Control)

The following ingredients were used for the preparation of the pre-emulsion 7.00%—Egg yolk 0.35%—NaCl 0.50%—Lactic acid (45%)

0.08%—Potassium Sorbate 30.00%—Butterfat 62.07%—Deionised water all by weight of this phase.

The pre-emulsion phase was made by dispersing the egg yolk in water (60° C.) using a Silverson, followed by the addition of NaCl, Potassium Sorbate. Butterfat was heated up to 60° C. and mixed with the aqueous phase for 10 minutes to form a coarse "pre-emulsion". This pre-emulsion was acidified with lactic acid and then homogenised using a Crepaco TM 3 piston homogeniser at a pressure of 1×10⁴ kNm⁻² (100 bar). The total fat content (based on the final composition was 30%, pH was 5.0.

The elastic modulus of sample G (control, as no microgel particles are present) was measured in accordance with the method used in comparative example A. The resulting elastic modulus plot G' is shown in FIG. 2.

Example H

By The microgel particles were prepared in accordance with method described in Example A.

Separately, the emulsion ingredients (Table 2, Example H) were used for the preparation of the emulsion phase. The emulsion phase was made by dispersing the egg yolk in water (60° C.) using a Silverson, followed by the addition of NaCl, Potassium Sorbate. Butterfat was heated up to 60° C. and mixed with the aqueous phase for 10 minutes to form a coarse "pre-emulsion". Pre-emulsion was acidified with lactic acid.

The premix of dispersed microgel particles was mixed with the emulsion phase using a pin stirred C-unit at a phase volume of 55 to 45.55% of the volume is occupied by the microgel particles. The fat content (in the final composition) was 30%.

The elastic modulus of sample H was measured in accordance with the method used in comparative example A. The resulting elastic modulus plot H is shown in FIG. 2.

Example I (Control)

The microgel particles were prepared in accordance with method described in Example A.

Separately, the water phase ingredients (Table 2, Example I) were used for the preparation of the aqueous phase. The aqueous phase was made by dispersing the egg yolk in water (60° C.) using a Silverson, followed by the addition of NaCl, Potassium Sorbate and acidification step.

The premix of dispersed microgel particles was mixed with the aqueous phase using a pin stirred C-unit at a phase volume of 55 to 45.55% of the volume is occupied by the microgel particles. The fat content (in the final composition) was 0%.

The elastic modulus of sample I (control, as no fat is present) was measured in accordance with the method used in comparative example A. The resulting elastic modulus plot I is shown in FIG. 2.

TABLE 2

| Ingredients | G control % | H % | I control % |
|---|---|---|---|
| Egg yolk | 7.00 | 15.54 | 15.54 |
| NaCl | 0.35 | 0.78 | 0.78 |
| Lactic acid | 0.50 | 1.11 | 1.11 |
| K-Sorbate | 0.08 | 0.18 | 0.18 |
| Butterfat | 30.00 | 66.60 | 0.00 |
| Deionised water | 62.07 | 15.79 | 82.39 |

Example 1

20% Fat Mayonnaise

The microgel particles were prepared in accordance with method described in Example A.

Separately, the following emulsion ingredients were used for the preparation of the emulsion phase (without the microgel particles):

11.10%—Egg yolk
22.20%—Double cream (47.5% fat)
1.11%—NaCl
5.55%—Sucrose
6.67%—Spirit vinegar (8%)
0.67%—Lactic acid (45%)
0.17%—β-carotene (1% dispersion)
0.17%—Potassium Sorbate
4.44%—Mustard Dijon
5.55%—PK 38
5.55%—CN
23.31%—SFO
13.51%—Deionised water
all by weight of this phase.

The emulsion phase was made by dispersing the egg yolk in water (60° C.) using a Silverson, followed by the addition of spirit vinegar, mustard, NaCl, sucrose, β-carotene, Potassium Sorbate. PK 38, CN and SFO were heated to 60° C. and mixed with the aqueous phase for 10 minutes to form a coarse "pre-emulsion". Pre-emulsion was acidified with 45% lactic acid and then homogenised using a Crepaco TM 3 piston homogeniser at a pressure of $1 \times 10^4$ $kNm^{-2}$ (100 bar).

The premix of dispersed microgel particles was mixed with the emulsion phase using a pin stirred C-unit at a phase volume of 55 to 45 to form a spoonable aqueous-continuous mayonnaise, having 55% of the volume occupied by the microgel particles. The fat content of the final emulsion was 20.25%. The elastic modulus between 6 and 8 Hz was about 3500 Pa. The example has consistency comparable to that of a commercial full fat mayonnaise with the melting behaviour of the solid fat giving a quick oral breakdown (instead of slow, as in traditional low fat mayonnaises).

Example 2

30% Butterfat Spread

As example 1 except that the emulsion phase contained the following ingredients:
15.54%—Egg yolk
0.78%—NaCl
0.18%—Potassium Sorbate
66.60%—Concentrated butterfat (99.8%)
1.10%—Lactic acid
15.80%—Deionised water
all by weight of this phase alone.

The spread was prepared by mixing the microgel and emulsion phases as described in Example 1. The fat content was 30%. The elastic modulus between 6 and 8 Hz was about 24500 Pa. The resultant spread had a smooth appearance and a consistency similar to that of other low fat spread.

Example 3

Zero Fat Spread

As example 1 except for the emulsion phase. Emulsion phase ingredients:
15.55%—Egg yolk
3.33%—NaCl
0.07%—β-carotene 1% water phase
0.33%—Potassium Sorbate
3.33%—PK 38 (solid fat)
3.33%—CN (solid fat)
0.31%—Xanthan RD
73.75%—Deionised water
Lactic acid to pH 5
all by weight of this phase.

The spread was prepared by mixing the microgel and emulsion phases as described in example 1. The fat content of zero fat spread was 3%. The elastic modulus between 6 and 8 Hz was about 4150 Pa. The resultant spread was comparable in appearance and consistency to a commercial 20% fat spread.

Example 4

20% Fat Mayonnaise (All-In-One Process)

The gel-forming kappa and iota carrageenan (as in Example 1) were directly mixed with the emulsion premix for 10 minutes and stored at 70° C. prior to the processing. The all-in-one mayonnaise was prepared by cooling it to 5° C. whilst shearing it through a scraped surface heat exchanger at 4000 rpm and stored at 5° C. The fat content was 20%.

Final Product Ingredients:
4.0%—egg yolk
0.9%—NaCl
2.5%—Sucrose
2.0%—Spirit vinegar 8%
0.1%—Potassium Sorbate
2.3%—Mustard Dijon
1.5%—PK 38 (solid fat)
1.5%—CN (solid fat)
17.0%—SFO (liquid oil)
0.7%—Iota carrageenan
0.7%—Kappa carrageenan
0.3%—Potassium Chloride
66.5%—Deionised water The mayonnaise was very smooth with consistency close to full fat mayonnaise. The elastic modulus between 6 and 8 Hz was about 2000 Pa.

Example 5

(Emulsion, With Whey and Monoglyceride in Stead of Egg Yolk)

A reference emulsion was prepared by preparing a pre-emulsion as set out below.
0.50%—Whey protein
0.25%—Hymono 7804
0.35%—NaCl
0.08%—Potassium Sorbate
5.00%—PK 38 (solid fat)
5.00%—CN (solid fat)
88.82%—Deionised water
all by weight of this phase.

This pre-emulsion was mixed with the micro-gel particle emulsion as in example 1 (containing kappa and iota carrageenan), until homogeneous product was obtained and a; stored at SOC. 55% of the volume is occupied by the microgel particles. The fat content was 4.5%, pH was 6.2. The elastic modulus is set out in FIG. 3. The product was spoonable.

Example 6

(Emulsion, With Whey and Monoglyceride in Stead of Egg Yolk)

A reference emulsion was prepared by preparing a pre-emulsion as set out below.

0.50%—Whey protein
0.25%—Hymono 7804
0.35%—NaCl
0.08%—Potassium Sorbate
10.00%—PK 38 (solid fat)
10.00%—CN (solid fat)
88.82%—Deionised water
all by weight of this phase.

Figure 4:
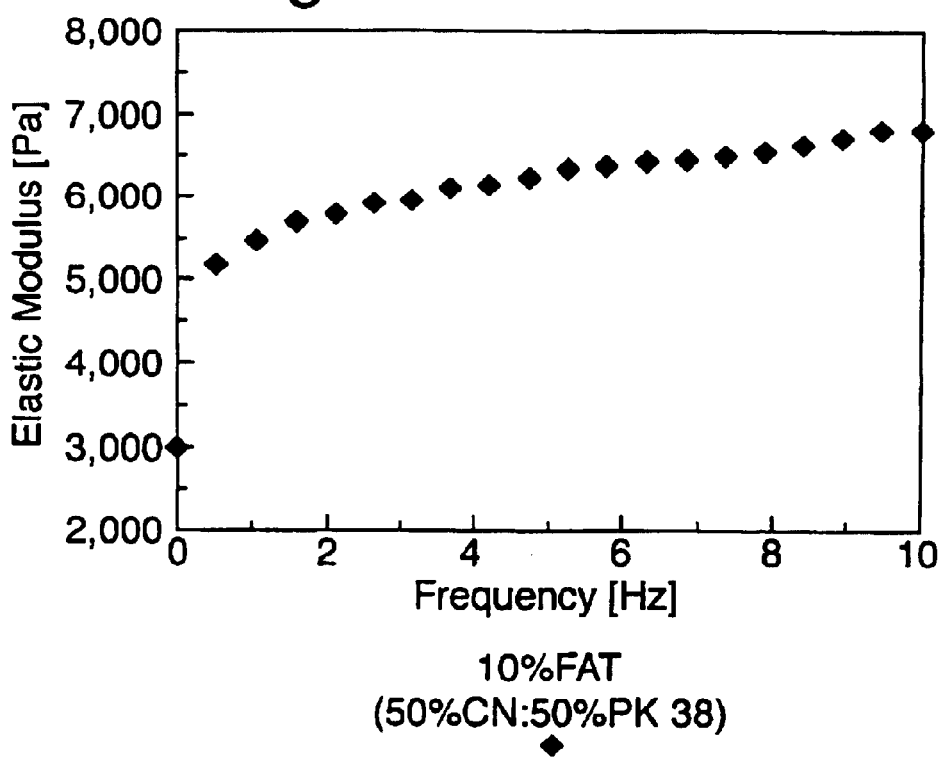

This pre-emulsion was mixed with the micro-gel particle emulsion as in example 1 (containing kappa and iota carrageenan), until homogeneous product was obtained and stored at 5° C. 50% of the volume is occupied by the microgel particles. The fat content was 10%, pH was 6.2. The elastic modulus is set out in FIG. 4. The product was spreadable.

What is claimed is:

1. Edible spoonable or spreadable composition containing:
   10–65% of water as a continuous phase,
   1–45% of a fat phase,
   30–80% microgel particles,
   0.1–10% of a stabilizing emulsifier,
   0.1–2% of a de-stabilizing emulsifier, and
   wherein the composition has an elastic modulus (G') of at least 250 Pa and less than 100,000 Pa.

2. Composition according to claim 1, wherein the elastic modulus (G') is at least 500 Pa and less than 10,000 Pa.

3. Composition according to claim 1, wherein the fat phase comprises at least 50% of a fat which is solid at 10° C.

4. Composition according to claim 3, wherein said solid fat comprises hardened palm kernel fat (PK38), coconut fat (CN), hardened coconut fat (CN33), butter fat or mixtures thereof.

5. Composition according to claim 1, wherein the de-stabilizing emulsifier is selected from the group consisting of monoglycerides, lecithin, polyglycerol esters, and Tween's.

6. Composition according to claim 1, wherein the amount of protein and the amount of de-stabilizing emulsifier are provided by 0.2–25%.

7. Composition according to claim 6 wherein the emulsifier is provided as 5–20% egg yolk.

8. Composition according to claim 1, wherein at least 80% (by weight) of the microgel particles has a size of 5–100 μm.

9. Composition according to claim 1, wherein the amount of the fat phase is 1–25% by weight, based on the total composition.

10. Composition according to claim 1, wherein the aqueous phase forms a continuous phase with the fat phase as a continuous network therein, giving a bi-continuous structure with the microgel particles dispersed in the water phase.

11. Composition according to claim 1, wherein the microgel particles comprise a gel-forming hydrocolloid, selected from the group consisting of agar, alginate, pectin, gellan and carrageenans.

12. Mayonnaise-type composition, spread, dressing, sauce, topping, filling, characterized in that they comprise the composition according to claim 1.

13. Composition according claim 1 wherein the stabilizing emulsifier is a protein.

14. Process for the preparation of a spreadable or spoonable food composition having an elastic modulus (G') of between 250 and 100,000 Pa, which composition comprises
   10–65% of water as a continuous phase,
   1–45% of a fat phase,
   30–80% microgel particles,
   0.1–10% of a protein,
   0.01–2% of a de-stabilizing emulsifier,
   and which process comprises at least the steps of:
      melting the fat phase to produce melted fat,
      emulsifying the melted fat in the water phase,
      adding the microgel particles,
      mixing,
      cooling to a temperature at which at least 50% of the fat is solid,
      and wherein the protein is added to the water phase or the fat phase, or both, prior to adding the micro gel particles.

15. Process according to claim 14, wherein the emulsion is homogenized before adding microgel particles.

16. Process according to claim 14, wherein the cooling is effected to a temperature of less than 10° C., preferably less than 5° C.

* * * * *